United States Patent [19]
Ito et al.

[11] Patent Number: 5,314,518
[45] Date of Patent: May 24, 1994

[54] METHOD FOR PRODUCING GLASS PREFORM FOR OPTICAL FIBER

[75] Inventors: Masumi Ito; Sumio Hoshino; Shinji Ishikawa, all of Yokohama, Japan

[73] Assignee: Sumitomo Electric Industries, Ltd., Osaka, Japan

[21] Appl. No.: 902,821

[22] Filed: Jun. 23, 1992

[30] Foreign Application Priority Data

| Jun. 24, 1991 | [JP] | Japan | 3-151751 |
| Jun. 24, 1991 | [JP] | Japan | 3-151752 |
| Sep. 6, 1991 | [JP] | Japan | 3-227182 |
| Oct. 14, 1991 | [JP] | Japan | 3-264876 |

[51] Int. Cl.$^5$ ............................. C03B 37/023
[52] U.S. Cl. ........................... 65/3.11; 65/3.12; 65/18.3; 65/901
[58] Field of Search ............ 65/3.11, 3.12, 18.1, 65/18.3, 901

[56] References Cited

U.S. PATENT DOCUMENTS

| 4,141,710 | 2/1979 | Aulich et al. | 65/3.12 |
| 4,675,038 | 6/1987 | Ainslie et al. | 65/3.12 |
| 5,153,940 | 6/1992 | DiGiovanni et al. | 65/3.12 |
| 5,154,745 | 10/1992 | Le Sergent | 65/3.12 |

FOREIGN PATENT DOCUMENTS

| 0433643 | 6/1991 | European Pat. Off. |  |
| 0443781 | 8/1991 | European Pat. Off. |  |
| 1203236 | 8/1989 | Japan . |  |
| 2023571 | 1/1980 | United Kingdom | 65/901 |

OTHER PUBLICATIONS

DiGiovanni et al, "New optical fiber fabrication technique using sol-gel dipcoating", Optical Fiber Communication Conference, Technical Digest OFC '91, Feb. 18-22, 1991, WA2.

Primary Examiner—Robert L. Lindsay
Attorney, Agent, or Firm—Cushman, Darby & Cushman

[57] ABSTRACT

A glass preform for an optical fiber containing a dopant in a core portion at a high concentration is produced by providing a glass tube, forming a coating film of a sol-gel solution containing a dopant compound on an inner wall of the glass tube, vitrifying and collapsing the glass tube having the coating of the sol-gel solution to obtain a glass rod.

14 Claims, 2 Drawing Sheets

METHOD FOR PRODUCING GLASS PREFORM FOR OPTICAL FIBER

BACKGROUND OF THE INVENTION

Field of the Invention

The present invention relates to a method for producing a glass preform for use in the fabrication of an optical fiber, in particular, an optical fiber which is used as an optical fiber laser or an light amplifying fiber.

Description of the Related Art

An optical fiber comprising a core to which a rare earth element such as Er or Nd is added is mainly used as a light amplifying fiber.

As a method for adding a rare earth element to a quartz optical fiber, there are known a vapor phase addition method and a solution-impregnation method.

In one example of the gas phase addition method, when a core part is formed on an inner wall of a quartz pipe by the MCVD method, a compound of a rare earth element is heated around 1000° C. and a vapor of the compound is supplied in the quartz pipe together with a vapor of a glass-forming material such as $SiCl_4$ and $GeCl_4$, then the pipe is heated to a high temperature to vitrify the compound and also collapse the pipe to obtain a preform, which is drawn to fabricate an optical fiber.

One example of the solution-impregnation method utilizes a soot preform for a core part which is produced by the VAD method. In this method, the soot preform for the core part is dipped in a solution of a compound of a rare earth element dissolved in an alcohol. After removing the soot preform from the solution, the alcohol is evaporated off from the soot preform at room temperature to deposit the compound of the rare earth element on the glass soot. Then, the glass soot carrying the compound of the rare earth element is sintered and vitrified to produced a transparent preform.

In order to use the quartz optical fiber containing the rare earth element as the optical fiber laser or the optical amplifying fiber, a higher concentration of a dopant compound of a rare earth element is preferred. However, in the conventional methods, since the vitrification of the glass soot requires a high temperature of 1500° C. or higher, the rare earth element tends to be associated and crystallized in the glass so that the rare earth element cannot be uniformly added to the glass.

SUMMARY OF THE INVENTION

An object of the present invention is to provide a method for producing a glass preform for use in the fabrication of an optical fiber by which the rare earth element can be added to the preform at a high concentration.

Another object of the present invention is to provide a method for producing a glass preform for use in the fabrication of an optical fiber by which the rare earth element can be added to the preform uniformly.

According to a first aspect of the present invention, there is provided a method for producing a glass preform for use in the fabrication of an optical fiber which comprises steps of:

providing a glass tube which forms a core part of the preform, forming a coating film of a sol-gel solution comprising $SiO_2$ and a dopant compound on an inner wall of said glass tube, vitrifying and collapsing said glass tube having the coating of the sol-gel solution to obtain a glass rod as a core part of the preform and providing a cladding part around the periphery of said glass rod.

In an embodiment of this method, the glass rod is inserted in a cladding glass tube having a refractive index lower than that of the core glass rod and they are fused together to form a glass preform.

According to a second aspect of the present invention, there is provided a method for producing a glass preform for use in the fabrication of an optical fiber which comprises steps of:

providing a glass tube consisting of an inner wall which forms a core part and an outer wall which forms a cladding part, forming a coating film of a sol-gel solution comprising $SiO_2$ and a dopant compound on an inner wall of said glass tube, and vitrifying and collapsing said glass tube having the coating of the sol-gel solution while flowing a mixture of chlorine and oxygen through the glass tube to obtain a glass preform.

In a preferred embodiment of the second method, a vapor of a metal compound is flowed through the glass tube before flowing the mixture of chlorine and oxygen.

DETAILED DESCRIPTION OF THE INVENTION

Figure 1:
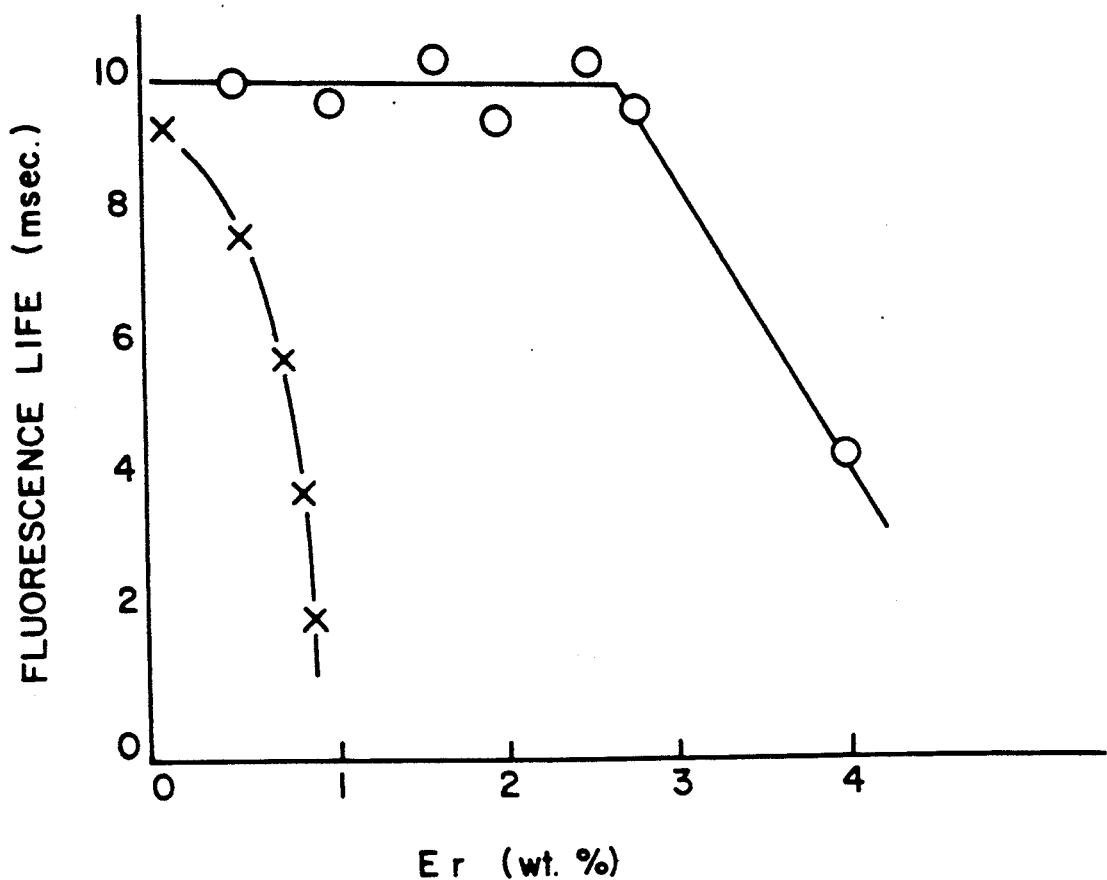
FIG. 1 is a graph showing the dependency of fluorescence life on a concentration of erbium in the core of the optical fiber fabricated in Example 1.

As explained above, as the vitrification temperature increases, the rare earth elements associate each other. To obtain a glass in which a large amount of the rare earth element is dispersed in an ionic state, a low vitrification temperature is desired.

The sol-gel method uses a metal alkoxide as a raw material, and the metal alkoxide is hydrolyzed with water in an alcoholic solution and a hydroxide is changed to a silica glass at a comparatively low temperature of about 1000° C. By the sol-gel method, a glass containing the uniformly added rare earth element in a high concentration is produced by dissolving the rare earth element in the solution.

While the maximum concentration of the rare earth element is 1% by weight in the method using the porous soot preform, it is about 5% by weight by the sol-gel method.

According to the first aspect of the present invention, the glass film containing the added rare earth element is formed on an inner surface of the glass tube which forms the core part by the sol-gel method. Then, the glass tube is heated to solidify the tube to form a rod which is used as a core. By this method, the core glass rod contains the rare earth element at a higher concentration at or near an axis of the rod than a peripheral part of the rod.

As the metal alkoxide to be used in the sol-gel method, any of conventionally used ones may be used. Preferred examples of the alkoxide are methoxide, ethoxide, propoxide and butoxide of silicon, germanium and aluminum.

As an alcohol to be used in the sol-gel method, methanol, ethanol, propanol, isopropanol and butanol are preferred.

A molar ratio of the metal alkoxide, water and the alcohol is not critical and may be the same as that used in this field. For example, a molar ratio of the metal alkoxide, water and the alcohol is 5:53:42.

As a catalyst, an acid or an alkali may be added, to the solution. Preferred examples of the acid are hydrochloric acid, nitric acid, sulfuric acid and phosphoric acid, and preferred example of the alkali is aqueous ammonia.

A composition of an aqueous solution used in the sol-gel method may be in a conventional range in this art field. For example, a molar ratio of the alcohol to water is from 0.5:1 to 5:1, a molar ratio of water to be added during hydrolysis to the metal alkoxide is from 2:1 to 5:1. The acid as a catalyst is used in an amount such that pH of the solution is from 1 to 5.

As the rare earth element as the dopant, lanthanoids, in particular, Er, Nd and Pr are preferred. The rare earth element is used in the form of a salt such as chloride or nitrate.

To apply the sol-gel solution on the inner surface of the glass tube, a dip coating method is preferred. For example, the glass tube is dipped in the sol-gel solution and pulled up at a constant speed, or the sol-gel solution is filled in the glass tube and drained at a constant rate. After the application of the sol-gel solution, the glass tube is dried and the solution is gelled by conventional methods. For example, the glass tube is dried at a temperature of about 150° C. and heated at a temperature of about 1000° C.

After the above steps, the glass tube is collapsed and solidified at a temperature of 1500° to 1800° C. by a conventional method for the production of the glass rod to obtain a glass rod. Then, the glass rod may be drawn to a specific size or its outer surface is cleaned by a conventional method.

During the formation of the gel and the collapsing of the glass tube, preferably a mixture of chlorine and oxygen is flowed in the glass tube. A concentration of the oxygen gas in the mixture is preferably from 10 to 60% by volume.

Thereafter, a cladding portion is formed around the periphery of the glass rod. For example, the glass rod is inserted in a glass tube for a cladding having a lower refractive index than that of the core glass rod and fused together by a so-called rod-in-tube method to obtain a glass preform for an optical fiber. Alternatively, the cladding portion may be formed by the VAD or CVD method.

When the glass tube is for the cladding portion, the glass layer formed by the sol-gel method functions as the core portion. Therefore, the collapsing of the glass tube provides a glass preform for use in the fabrication of the optical fiber.

The glass tube for the cladding portion has a lower refractive index than that of the core portion. When the $SiO_2$ film is coated, the cladding glass tube is made of a glass containing fluorine. When the glass film containing titanium or germanium and having an increased refractive index, the cladding glass tube is made of a fluorine-doped glass or a silica glass.

In the second aspect of the present invention, the glass tube consists of the core portion and the cladding portion, and the glass coating containing the dopant is formed by the same sol-gel method as in the first aspect.

In a preferred embodiment, after the formation of the glass coating, a vapor of a metal compound is flowed through the glass tube and then the glass coating is vitrified and the glass tube is collapsed while flowing the mixture of chlorine and oxygen therethrough.

The metal compound is used to adjust the refractive index of the glass coating formed by the sol-gel method.

Examples of the metal are silicon, germanium, titanium, boron, aluminum, phosphorus and the like. The metal is used in the form of a chloride, alkoxide and the like.

The compound of the metal is flowed in the glass tube using an inert gas (e.g. argon, helium, nitrogen, etc.) as a carrier gas.

The use of chlorine will remove moisture from the glass coating and decreases the transmission loss of the finally fabricated optical fiber. The use of oxygen will oxidize the rare earth element in the glass coating and the metal used for adjusting the refractive index and stabilize them. Also, oxygen will prevent evaporation of the metal compound during heating the glass tube to vitrify the glass coating.

Since the glass coating formed by the sol-gel method is porous, it absorbs the metal compound. By adjusting a concentration of the metal compound, the refractive index of the glass coating is controlled easily.

The glass tube consisting of the core portion and the cladding portion may be produced by the VAD method or the MCVD method. In the case of the VAD method, the soot preform is vitrified and then bored along its center axis. In the case of the MCVD method, the cladding portion and the core portion are formed on an inner wall of a silica glass tube.

The application of the sol-gel solution is the same as in the first aspect.

PREFERRED EMBODIMENTS OF THE INVENTION

The present invention will be illustrated by the following examples.

EXAMPLE 1

Silicon ethoxide (10 ml) as a glass-forming raw material was mixed with water (10 ml) and ethanol (20 ml). To the mixture, erbium chloride (0.93 g) was added and mixed to obtain a homogeneous solution.

A glass tube having an outer diameter of 10 mm and a inner diameter of 6 mm was produced by synthesizing silica glass rod by the VAD method and boring it along its center axis.

In the bore of the glass tube, the above solution was flowed to apply the solution on the inner surface of the glass tube. The coated solution was dried at 100° C. for 24 hours to form a coating film. The coating film was further heated at 1000° C. to vitrify it.

The glass tube was then heated with an oxyhydrogen burner to collapse the bore while flowing a gaseous mixture of helium, chlorine and oxygen in a volume ratio of 4:3:3 to obtain a glass rod.

The glass rod was drawn to an outer diameter of 2 mm to obtain a core rod.

The core rod was inserted in a fluorine-doped glass tube which was produced by the VAD method and had an outer diameter of 25 mm and an inner diameter of 2 mm. The fluorine-doped glass tube contained fluorine in an amount such that its refractive index was 0.34% lower than that of the core rod.

The fluorine-doped glass tube carrying the glass rod therein was heated and collapsed with the oxyhydrogen flame to obtain a glass preform.

The glass preform was drawn to fabricate an optical fiber, which was analyzed by EPMA to find the following results:

The optical fiber had a cladding diameter of 125 μm and a core diameter of 10 μm, and contained erbium at the center of the core. The erbium-containing part had a diameter of 0.3 μm, and a concentration of erbium was 5% by weight. Erbium was dispersed in the ionic state.

The method of the present invention provides an optical fiber in which ionic erbium is uniformly present at the center of the core.

By changing the concentration of erbium, several optical fibers were fabricated, and their fluorescence life was measured.

As an excitation light source, a frequency doubling of a Nd-YAG laser was used and fluorescence having a wavelength of 1.55 μm was measured by a sampling osciloscope. Dependency of the fluorescence life on the erbium concentration was studied.

By the conventional solution-impregnation method, some optical fibers containing erbium were fabricated, and the same experiment as above was carried out.

The result are shown in FIG. 1, in which O stands for the results for the optical fibers according to the present invention, and X stands for the results for the conventional optical fiber.

According to the present invention, the fluorescence life is long up to the high concentration of erbium. As the fluorescence life is longer, the optical fiber is more suitable for an optical fiber laser or an light amplifying fiber.

EXAMPLE 2

In the same manner as in Example 1 except that a sol-gel solution was prepared using silicon methoxide (10 ml), water (10 ml), ethanol (20 ml) and neodymium chloride (0.852 g), a core rod was produced and then a preform was produced. The preform was drawn to fabricate an optical fiber having an cladding diameter of 125 μm and a core diameter of 10 μm. The neodymium-containing part had a diameter of 0.3 μm, and a concentration of neodymium was 5% by weight. Neodymium was dispersed in the ionic state.

EXAMPLE 3

Silicon ethoxide (10 ml) as a glass-forming raw material was mixed with water (10 ml) and ethanol (20 ml). To the mixture, erbium chloride (0.93 g) was added and mixed to obtain a homogeneous solution.

A glass rod consisting of a core of pure silica and a cladding of a fluorine-doped silica and having a core diameter of 2 mm and an outer diameter of 16.5 mm was produced by by the VAD method. The fluorine was doped so that a refractive index of the cladding was 0.34% lower than that of the core. The rod was bored at a bore diameter of 1.5 mm.

In the bore of the glass tube, the above solution was flowed to apply the solution on the inner surface of the glass tube. The coated solution was dried at 100° C. for 5 hours to form a coating film having a thickness of 2 μm. The coating film was heated with an oxyhydrogen flame while flowing chlorine and oxygen at flow rates of 50 cc/min. and 50 cc/min. respectively to vitrify it, and collapsed to obtain a solid preform.

The solid preform was drawn to fabricate an optical fiber having a cladding diameter of 125 μm and a core diameter of 10 μm.

The optical fiber was analyzed by EPMA to find that erbium was doped in a center part of the core having a diameter of 1 μm at a concentration of 5% by weight.

EXAMPLE 4

To a mixture of silicon ethoxide (50 ml) as a glass-forming raw material, 1N hydrochloric acid (20 ml) and ethanol (20 ml), erbium chloride (1.6 g) was added and mixed to obtain a solution.

A fluorine-doped glass rod having an outer diameter of 20 mm and a refractive index 0.34% lower than that of pure silica was produced by the VAD method and bored at a bore diameter of 4 mm along its axis.

This glass tube was dipped in the above solution and pulled up at a rate of 100 mm/min. to coat the inner surface of the tube with the solution at a thickness of 2 μm. Then, the coated solution was vitrified by heating the glass tube with an oxyhydrogen flame while flowing chlorine and oxygen at flow rates of 50 cc/min. and 50 cc/min. respectively in the bore, followed by collapsing the tube to obtain a preform.

The glass preform was drawn to fabricate an optical fiber having a cladding diameter of 125 μm and a core diameter of 10 μm, which was analyzed by EPMA to find that the whole core was doped with erbium at a concentration of 5% by weight. The fluorescence life was 12 msec. which is the same as a fluorescence life when erbium is uniformly doped.

EXAMPLE 5

To a mixture of silicon ethoxide (50 ml), titanium isopropoxide (0.86 ml), 1N hydrochloric acid (20 ml) and ethanol (20 ml), erbium chloride (1.6 g) was added and mixed to obtain a solution.

A pure silica glass rod having an outer diameter of 20 mm was produced by the VAD method and bored at a bore diameter of 4 mm along its axis.

The center bore of the glass tube was filled with the above solution and drained through a valve which was connected to the lower end of the tube at a constant rate to coat the inner surface of the tube with the solution at a thickness of 2 μm. Then, the coated glass tube was treated in the same manner as in Example 4 to obtain a preform.

The glass preform was drawn to fabricate an optical fiber having a cladding diameter of 125 μm and a core diameter of 10 μm, which was analyzed by EPMA to find that the whole core was doped with erbium at a concentration of 5% by weight. The fluorescence life was 12 msec. which is the same as a fluroescence life when erbium is uniformly doped.

The refractive index of the core was 0.35% higher than the sure silica cladding.

EXAMPLE 6

To a mixture of silicon ethoxide (10 ml), water (10 ml ) and ethanol (20 ml), erbium chloride (0.93 g) was added and mixed to obtain a solution.

A glass rod having an outer diameter of 16.5 mm and a core diameter of 2 mm and a refractive index of a core of 0.9% higher than that of a cladding was produced by the VAD method and bored at a bore diameter of 1.5 mm along its axis.

In the bore, the above solution was filled and drained to coat the inner surface of the tube with the solution at a thickness of 2 μm. Then, the coated solution was heated with an oxyhydrogen flame while flowing SiCl₄ and GeCl₄ at flow rates of 30 cc/min. and 60 cc/min. respectively in the bore and then vitrified while flowing chlorine and oxygen at flow rates of 50 cc/min. and 50 cc/min. respectively, followed by collapsing the tube to obtain a preform.

Figure 2:
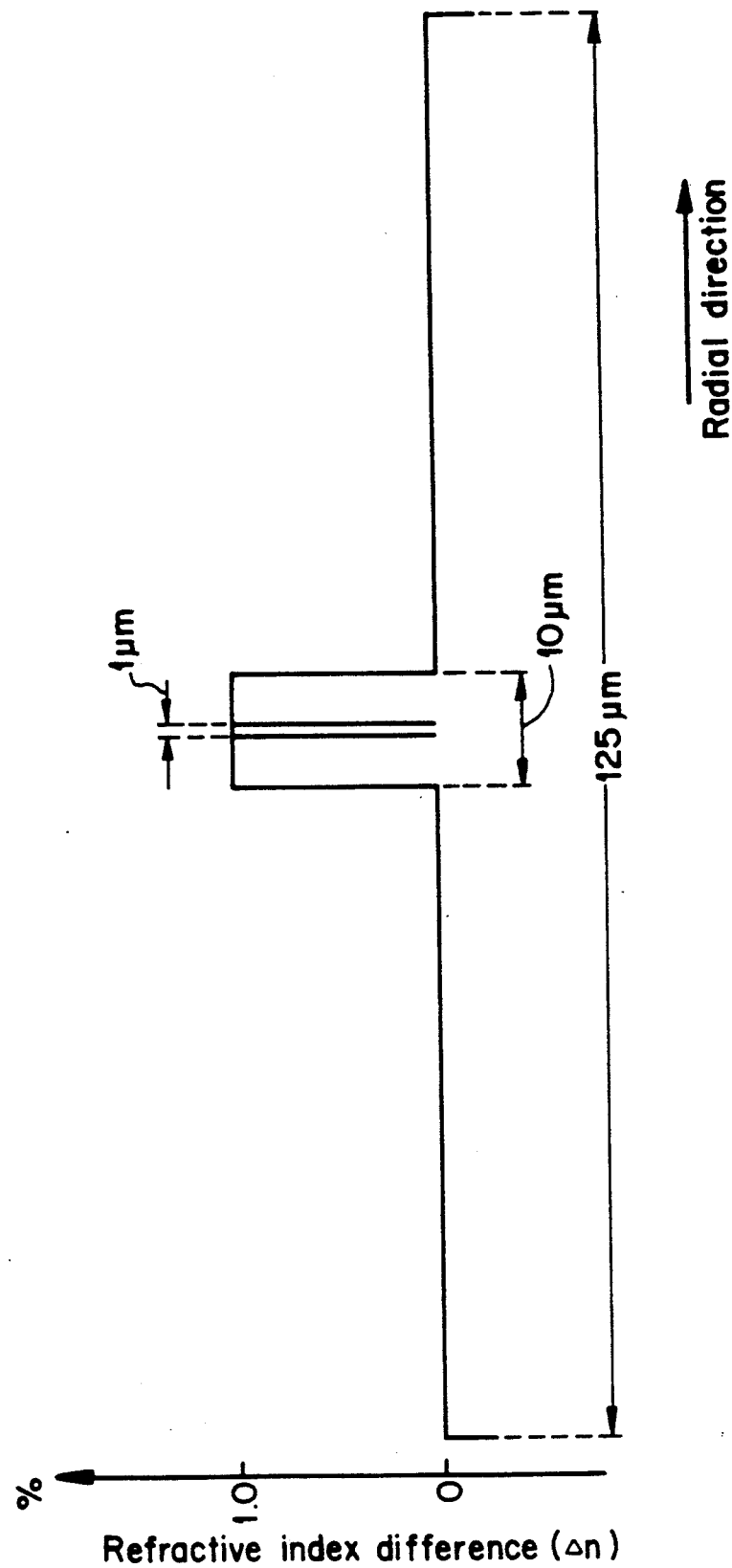
FIG. 2 is a refractive index profile of an optical fiber fabricated in Example 6.

The glass preform was drawn to fabricate an optical fiber having a cladding diameter of 125 μm and a core diameter of 10 μm and a refractive index profile of FIG. 2, which was analyzed by EPMA to find that the core was doped with erbium at a concentration of 5% by weight in a diameter of 1 μm around the center axis.

EXAMPLE 7

To a mixture of silicon methoxide (10 ml), aluminum ethoxide (1 g), water (10 ml) and propanol (20 ml), neodymium chloride (1 g) was added and mixed to obtain a homogeneous solution.

In a silica tube, a core layer containing germanium was formed by the MCVD method. The core layer had a refractive index 1.5% higher than that of cladding silica.

This glass tube was dipped in the above solution and pulled up to coat the inner surface of the tube with the solution. Then, the coated solution was heated with an oxyhydrogen flame while flowing SiCl₄ and GeCl₄ at flow rates of 30 cc/min. and 90 cc/min. respectively in the bore and then vitrified at a higher temperature while flowing chlorine and oxygen at flow rates of 50 cc/min. and 50 cc/min. respectively, followed by collapsing the tube to obtain a preform.

The glass preform was drawn to fabricate an optical fiber having a cladding diameter of 125 μm and a core diameter of 10 μm, which was analyzed by EPMA to find that the core was doped with aluminum and neodymium at concentrations of 3% by weight and 5% by weight, respectively in a diameter of 3 μm from its center axis.

What is claimed is:

1. A method for producing a glass preform for use in the fabrication of an optical fiber which comprises steps of:
    providing a glass tube which forms a core part of the preform,
    forming a coating film of a sol-gel solution comprising SiO₂ and a dopant compound on an inner wall of said glass tube,
    vitrifying and collapsing said glass tube having the coating of the sol-gel solution to obtain a glass rod as a core part of the preform, and
    providing a cladding part around the periphery of said glass rod
    wherein a diameter of said core part prepared from said sol-gel solution is 3 to 30% of the entire diameter of said core part.

2. The method according to claim 1, wherein said cladding part is provided around the periphery of said glass rod by inserting said glass rod in a cladding glass tube having a refractive index lower than that of said core glass rod and fusing them together.

3. The method according to claim 1, wherein said sol-gel solution comprises a metal alkoxide, water, an alcohol and said dopant compound.

4. The method according to claim 1, wherein said dopant is a rare earth element.

5. The method according to claim 3, wherein said metal alkoxide is at least one alkoxide selected from the group consisting of silicon alkoxide, germanium alkoxide and aluminum alkoxide.

6. A method for producing a glass preform for use in the fabrication of an optical fiber which comprises steps of:
    providing a glass tube consisting or an inner wall which forms a core part and an outer wall which forms a cladding part,
    forming a coating film of a sol-gel solution comprising SiO₂ and a dopant compound on an inner wall of said glass tube, and
    vitrifying and collapsing said glass tube having the coating of the sol-gel solution while flowing a mixture of chlorine and oxygen through the glass tube to obtain a glass preform wherein a diameter of said core part prepared from said sol-gel solution is 3 to 30% of the entire diameter of said core part.

7. The method according to claim 6, wherein a vapor of a metal compound is flowed through the glass tube after the formation of said coating film and before flowing the mixture of chlorine and oxygen.

8. The method according to claim 6, wherein silicon alkoxide is used as a SiO₂ source.

9. The method according to claim 6, wherein said dopant is a rare earth element.

10. The method according to claim 6, wherein said sol-gel solution contains at least metal alkoxide selected from the group consisting of silicon alkoxide, titanium alkoxide, germanium alkoxide and aluminum alkoxide.

11. The method according to claim 7, wherein said metal compound is at least one compound selected from silicon chloride, germanium chloride, titanium chloride, boron chloride, phosphorous chloride and aluminum chloride.

12. A method for producing a glass preform for use in the fabrication of an optical fiber which comprises steps of:
    providing a glass tube which forms a cladding part of the preform,
    forming a coating film of a sol-gel solution comprising SiO₂ and a dopant compound on an inner wall of said glass tube,
    vitrifying and collapsing said glass tube having the coating of the sol-gel solution while flowing a mixture of chlorine and oxygen through the glass tube to obtain a glass preform said sol-gel solution forming a core part of the preform wherein a diameter of said core part prepared from said sol-gel is 3 to 30% of the entire diameter of said core part.

13. The method according to claim 12, wherein said dopant is a rare earth element.

14. The method according to claim 12, wherein said sol-gel solution contains at least one alkoxide selected from the group consisting of silicon alkoxide, titanium alkoxide and germanium alkoxide.

* * * * *